United States Patent
Lee et al.

(10) Patent No.: US 9,817,767 B2
(45) Date of Patent: Nov. 14, 2017

(54) SEMICONDUCTOR APPARATUS AND OPERATING METHOD THEREOF

(71) Applicants: SK hynix Inc., Gyeonggi-do (KR); Industry-University Cooperation Foundation Hanyang University, Seoul (KR)

(72) Inventors: Sungbae Lee, Seoul (KR); Yong Ho Song, Gyeonggi-do (KR)

(73) Assignees: SK Hynix Inc., Gyeonggi-do (KR); Industry-University Cooperation Foundation Hanyang University, Seoul (KR)

( * ) Notice: Subject to any disclaimer, the term of this patent is extended or adjusted under 35 U.S.C. 154(b) by 50 days.

(21) Appl. No.: 14/983,767

(22) Filed: Dec. 30, 2015

(65) Prior Publication Data

US 2016/0328328 A1 Nov. 10, 2016

(30) Foreign Application Priority Data

May 6, 2015 (KR) .................. 10-2015-0062996

(51) Int. Cl.
*G06F 12/08* (2016.01)
*G06F 12/0868* (2016.01)
*G06F 12/0804* (2016.01)
*G06F 12/12* (2016.01)

(52) U.S. Cl.
CPC ...... *G06F 12/0868* (2013.01); *G06F 12/0804* (2013.01); *G06F 12/12* (2013.01); *G06F 2212/1016* (2013.01); *G06F 2212/282* (2013.01); *G06F 2212/313* (2013.01)

(58) Field of Classification Search
CPC .. G06F 12/0804; G06F 12/0868; G06F 12/12; G06F 12/121; G06F 2212/1016; G06F 2212/205; G06F 2212/214; G06F 2212/282; G06F 2212/283; G06F 2212/313; G06F 2212/7203
USPC ............ 710/52, 74; 711/103, 118, 119
See application file for complete search history.

(56) References Cited

U.S. PATENT DOCUMENTS

| | | | |
|---|---|---|---|
| 2007/0226401 A1* | 9/2007 | Huang | G06F 11/1068 711/103 |
| 2011/0022782 A1* | 1/2011 | Moshayedi | G06F 13/1668 711/103 |
| 2012/0311262 A1 | 12/2012 | Franceschini et al. | |
| 2013/0013860 A1 | 1/2013 | Franceschini et al. | |
| 2015/0134891 A1* | 5/2015 | Jo | G06F 13/28 711/103 |
| 2015/0301944 A1* | 10/2015 | Lu | G06F 12/0246 711/143 |

OTHER PUBLICATIONS

Park, J., et al., PRAM and NAND flash hybrid architecture based on hot data detection, 2nd International Conference on Mechanical and Electronics Engineering (ICMEE), 2010, pp. V1-93-V1-97.

(Continued)

*Primary Examiner* — Gary Portka
(74) *Attorney, Agent, or Firm* — IP & T Group LLP

(57) ABSTRACT

A semiconductor apparatus may include: a buffer configured to store write request data input in response to a write request from a host; a memory device configured to store data evicted from the buffer; and a controller configured to control the buffer and the memory device to process the write request.

12 Claims, 11 Drawing Sheets

(56) References Cited

OTHER PUBLICATIONS

Park, Y., et al., Power-aware memory management for hybrid main memory, The 2nd International Conference on Next Generation Information Technology (ICNIT), 2011, pp. 82-85.

Guo, J., et al., Low cost power failure protection for MLC NAND flash storage systems with PRAM/DRAM hybrid buffer, Design, Automation & Test in Europe Conference & Exhibition (DATE), 2013, pp. 859-864.

Lim, S., et al., An efficient NAND flash file system for flash memory storage, IEEE Transactions on Computers, Jul. 2006, pp. 906-912, vol. 55, No. 7.

Chung, T., et al., PORCE: An efficient power off recovery scheme for flash memory, Journal of Systems Architecture, Oct. 2008, pp. 935-943, vol. 54.

Tseng, H., et al., Understanding the impact of power loss on flash memory, Proceedings of the 48th Design Automation Conference (DAC '11), 2011, pp. 35-40.

Jung, S., et al., A process-aware hot/cold identification scheme for flash memory storage systems, IEEE Transactions on Consumer Electronics, May 2010, pp. 339-347, vol. 56, No. 2.

Lee, H., et al., HFTL: hybrid flash translation layer based on hot data identification for flash memory, IEEE Transactions on Consumer Electronics, Nov. 2009, pp. 2005-2011, vol. 55, No. 4.

Baek, S., et al., A dual-phase compression mechanism for hybrid DRAM/PCM main memory architectures, Proceedings of the great lakes symposium on VLSI (GLSVLSI '12), 2012, pp. 345-350.

Lee, S., et al., An efficient use of PRAM for an enhancement in the performance and durability of NAND storage systems, IEEE Transactions on Consumer Electronics, Aug. 2012, pp. 825-833, vol. 58, No. 3.

S. Cho et al., Flip-N-Write: A Simple Deterministic Technique to Improve PRAM Write Performance, Energy and Endurance, Dec. 12-16, 2009, MICRO, NY.

M. K. Qureshi et al., PreSET: Improving Read Write Performance of Phase Change Memories by Exploiting Asymmetry in Write Times, 2012, p. 380-391, ISCA.

\* cited by examiner

SEMICONDUCTOR APPARATUS AND OPERATING METHOD THEREOF

CROSS-REFERENCE TO RELATED APPLICATIONS

The present application claims priority of Korean Patent Application No. 10-2015-0062996, filed on May 6, 2015, which is incorporated herein by reference in its entirety.

BACKGROUND

1. Field

Exemplary embodiments of the present invention relate generally to semiconductor technology, and more particularly to a semiconductor apparatus and an operating method thereof to improve performance of a memory device having different set and reset times.

2. Description of the Related Art

FIG. 1 is a graph describing a phase change of a memory cell in a Phase Change Random Access Memory (PCRAM).

The graph illustrates the power required for a set and a reset operation as a function of time for a memory cell of a PCRAM. A set operation changes the memory cell from a reset, high resistance state (reset state) to a set, low resistance state (set state) while a reset operation changes the memory cell from a set state to a reset state.

As illustrated in FIG. 1, a set operation may require about eight times more time than a reset operation.

Generally, in a memory device, data may be written in units of a predetermined number of memory cells. Hence, during a write operation, a set operation may be performed on some of the memory cells at the same time as a reset operation is performed on other cells.

Thus, the time required for a write operation of a conventional memory device such as a PCRAM is dictated by the time required for the set operations to the memory cells, which may slow down the operation of a PCRAM.

The same problem occurs in any other memory device in which the time required for a write operation changes significantly according to the bit value to be written to a memory cell.

SUMMARY

Various embodiments may be directed to a semiconductor apparatus capable of improving an operation performance of a memory device included therein despite of different times between the set and reset operations of the memory device, and an operating method thereof.

In an embodiment, a semiconductor apparatus may include: a buffer configured to store write request data input in response to a write request from a host; a memory device configured to store data evicted from the buffer; and a controller configured to control the buffer and the memory device to process the write request.

In an embodiment, an operating method of a semiconductor apparatus including a memory device and first and second buffers may include: storing write request data input in response to a write request in the first buffer; reading from the memory device memory data at write request address input in response to the write request, and storing the memory data at write request address in the second buffer; performing a logic operation on the write request data stored in the first buffer and memory data stored in the second buffer; and updating the memory data at the write request address in the memory device with a result of the logic operation.

DETAILED DESCRIPTION

Figure 1:
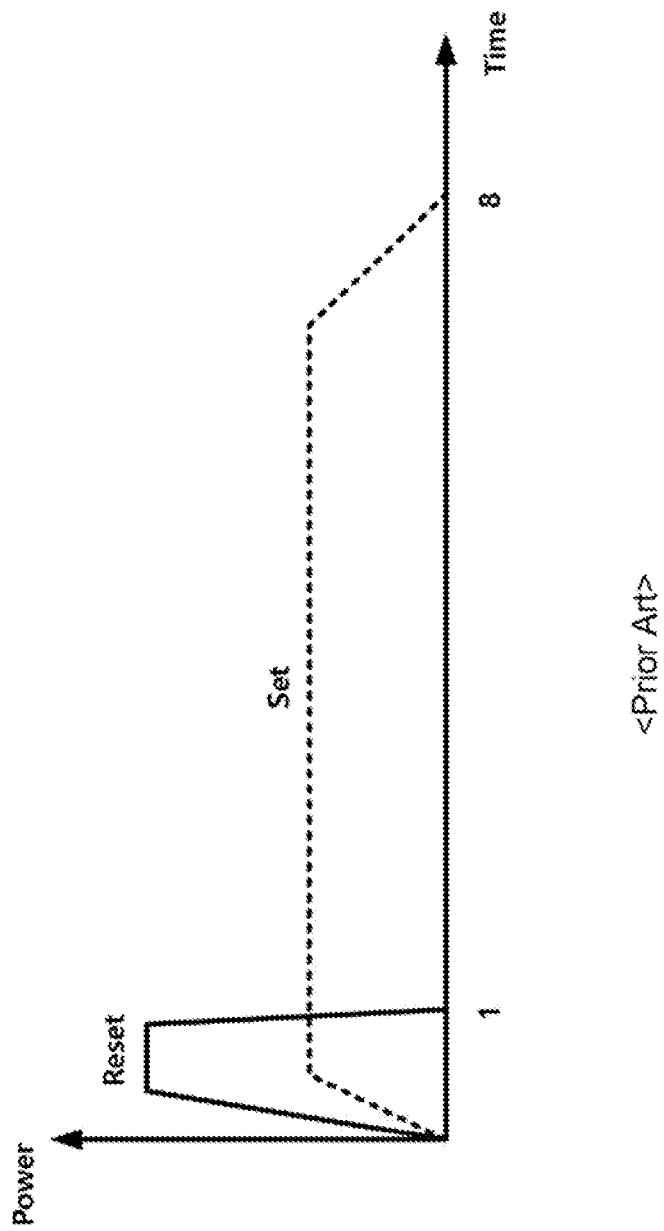
FIG. 1 is a graph for describing a phase change of a memory cell in a PCRAM.

Various embodiments will be described below with reference to the accompanying drawings. The present invention may, however, be embodied in different forms and should not be construed as limited to the embodiments set forth herein. Rather, these embodiments are provided so that this disclosure will be thorough and complete. Throughout the disclosure, like reference numerals refer to like parts throughout the various figures and embodiments of the present invention.

Figure 2:
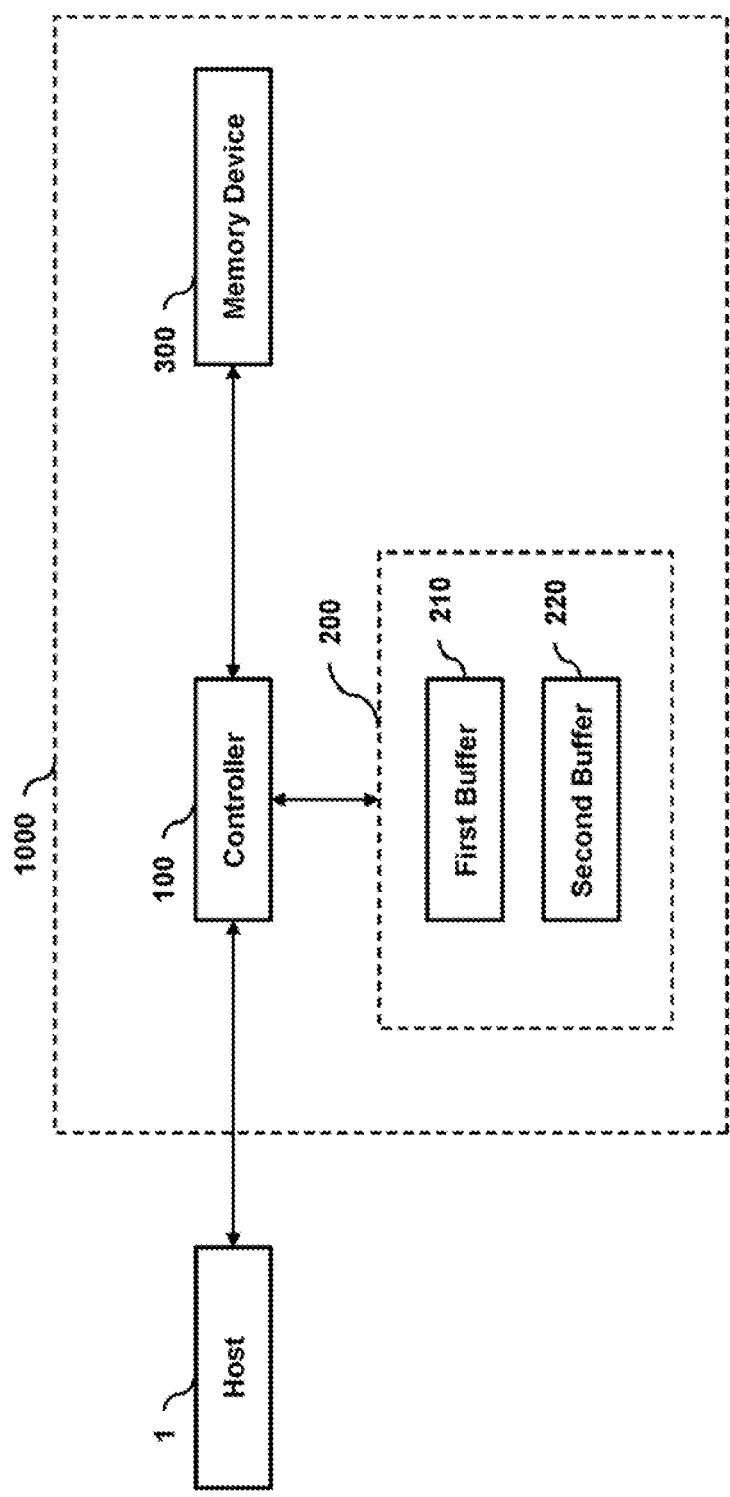
FIG. 2 is a block diagram of a semiconductor apparatus, according to an embodiment of the present invention.

Referring now to FIG. 2 an example of a semiconductor apparatus 1000 is provided. The semiconductor apparatus 1000 may include a controller 100, a buffer 200 and a memory device 300. The controller 100 may control a write request provided from a host 1 to the memory device 300. The buffer 200 may temporarily store data to be stored in the memory device 300 in response to the write request (hereinafter, also referred to as write request data).

Although not illustrated, data stored in the buffer 200 and the memory device 300 may be related to each other through an address mapping table, in which buffer addresses of the buffer 200 may be respectively mapped to memory addresses of the memory device 300.

The memory device 300 may include an arbitrary memory device having the characteristic that a write operation time changes according to the logic level of the data to be stored in the memory device 300. The PCRAM is an example of such a memory device.

The memory device 300 may include a single memory module. The memory device 300 may include a storage device including a plurality of memory modules, such as a Solid State Disk (SSD).

In an embodiment, the controller 100 the buffer 200, and the memory device 300 may be included in one package. In another embodiment, the controller 100, the buffer 200, and the memory device 300 may be included in different packages.

Examples of write and read operations performed by the controller 100 will be described below.

The buffer 200 may include first and second buffers 210 and 220. The buffer 200 may be implemented with a high-speed memory device such as DRAM or SRAM. However, the invention is not limited in this way and other types of buffer memory devices may be employed.

The first buffer 210 may perform a similar role to a cache for the memory device 300. Thus, write request data from the host 1 may be stored in the first buffer 210, before the write request data may be stored in the memory device 300.

The second buffer 220 may serve to temporarily store data.

In an embodiment, when the write request data may be first written to the first buffer 210 or updated in the first buffer 210 the second buffer 220 may temporarily store data which has been stored at an address may corresponding to the write request data (hereinafter, also referred to as a write request address) in the memory device 300.

In another embodiment, the second buffer 220 may temporarily store write request data before the write request data may be stored in the first buffer 210.

The storage space of the first buffer 210 may be set to be less than that of the memory device 300.

As the operation progresses, the first buffer 210 may run short of storage space. In this case, one or two or more data may be selected from the first buffer 210, and evicted to the memory device 300.

As described above, in response to a write request, the second buffer 220 may temporarily store the current data at the write request address in the memory device 300.

In this case, the controller 100 may perform a logic operation to the data temporarily stored in the second buffer 220 and the write request data stored in the first buffer 210. The data of the write request address of the memory device 300 may be updated with the logic operation result.

Figure 3:
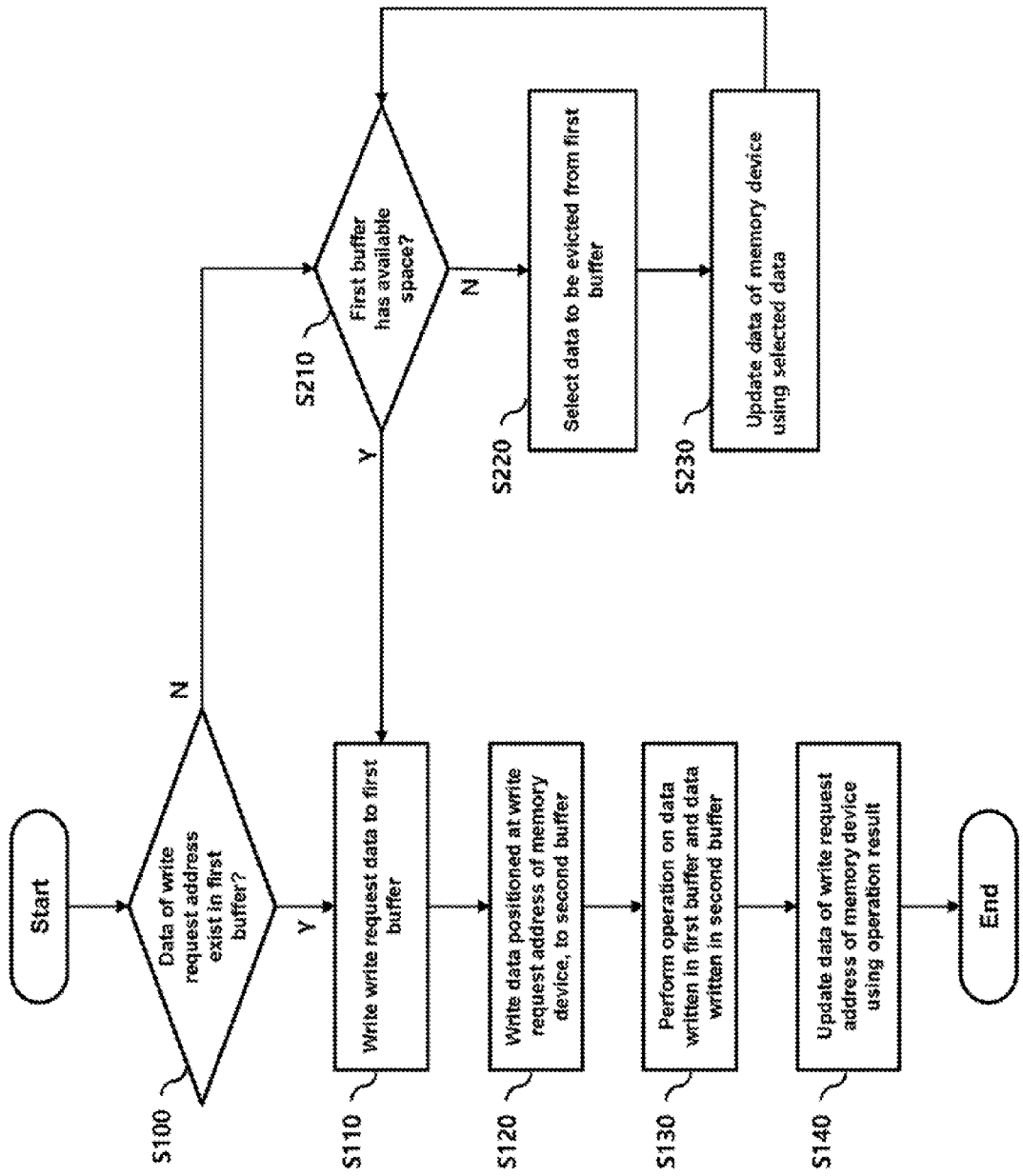
FIG. 3 is a flowchart illustrating an example of a write operation of a semiconductor apparatus, according to an embodiment of the present invention.

Referring now to FIG. 3 an example of a write operation of the semiconductor apparatus 1000 will be described. The write operation may be controlled by the controller 100. Accordingly, when a write request is provided from the host 1, the controller 100 may determine whether data at the write request address is stored in the first buffer 210 at step S100.

When the data of the write request address is stored in the first buffer 210 (e.g., a buffer hit), the controller 100 may then update the data of the write request address stored in the first buffer 210 with the write request data at step S110.

Then, the controller 100 may temporarily store the data at the write request address of the memory device 300 in the second buffer 220 at step S120.

The controller 100 may then perform a logic operation to the write request data stored in the first buffer 210 and the data of the write request address stored in the second buffer 220 at step 130.

The controller 100 may then update the data of the write request address in the memory device 300 with the logic operation result at step S140.

When the data of the write request address is not stored in the first buffer 210 (i.e., the buffer miss) as the determination result of step S100, the controller 100 may determine whether the first buffer 210 has an available space for the write request data at step S210.

When the first buffer 210 has an available space for the write request data, the controller 100 may then write the write request data to the available space in the first buffer 210 at step S110. Then, the controller 100 may perform steps S120 to S140 as described above.

When the first buffer 210 has no available space for the write request data as the determination result of step S210, the controller 100 selects data to be evicted from the first buffer 210 to the memory device 300 at step S220.

The data to be evicted may include one or more data. Criteria for selecting the data to be evicted may be set in various manners. For example, the least recently used data in the first buffer 210 may be selected to be removed.

At step S230, the controller 100 may then update the data in the memory device 300 with the data selected at step 220.

Then, the controller 100 may repeat steps S210 to S230 until the first buffer 210 has an available space for the write request data.

In the embodiment of FIG. 3, the respective steps of a write operation are described as being performed in a sequential manner. However, it is noted that a part or all of the respective steps, such as for example operations performed by the controller 100 may be performed in parallel, i.e. simultaneously or in an overlapping manner. For example, steps S110 and S120 may be performed in parallel at the same time.

Figure 4:
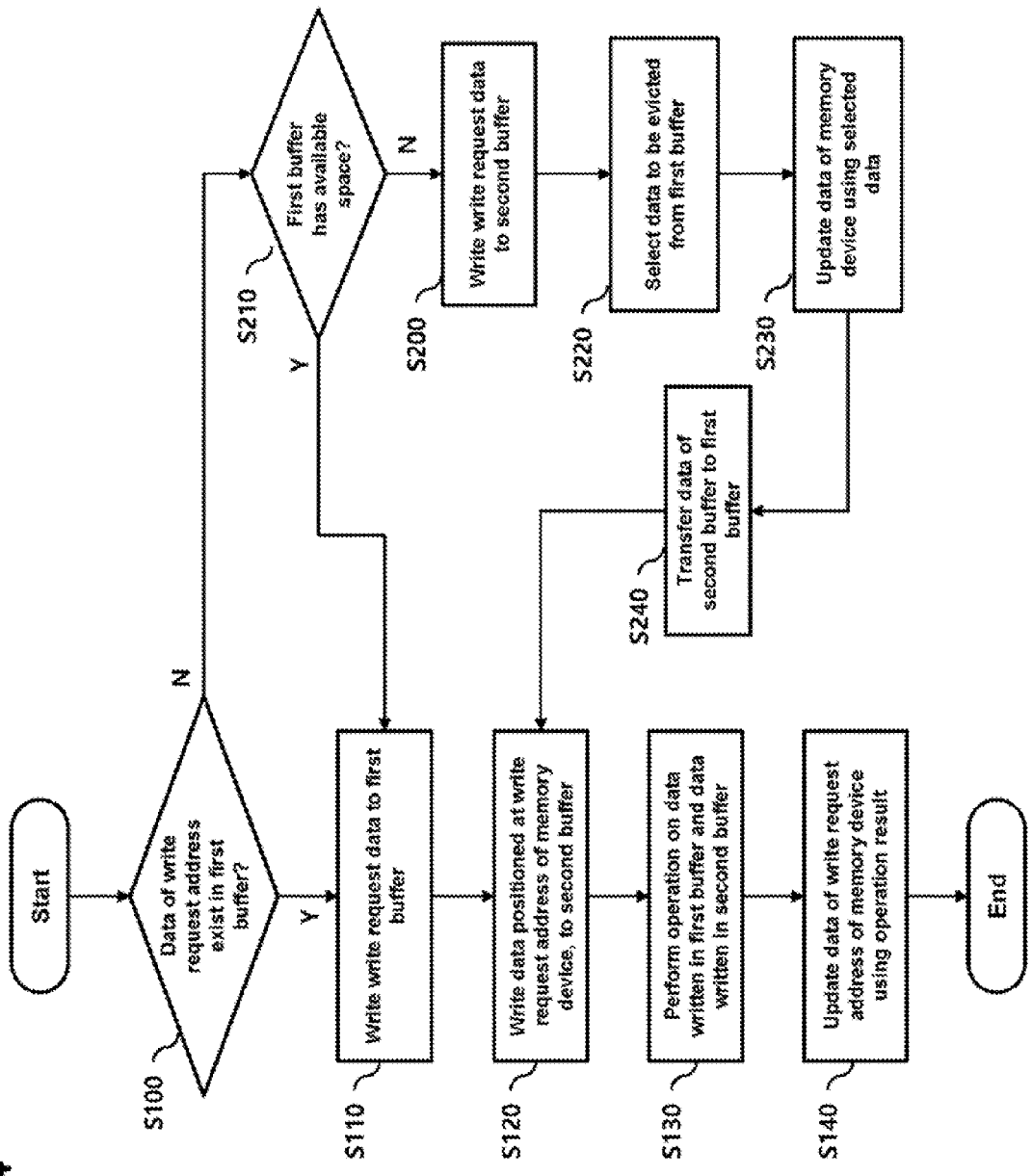
FIG. 4 is a flowchart illustrating another example of a write operation of a semiconductor apparatus according to an embodiment of the present invention.

FIG. 4 is a flowchart illustrating another example of a write operation. The write operation shown in FIG. 4 is the same as the example of the write operation of FIG. 3 except for the operation when the controller 100 may determine that the first buffer 210 has no available space for the write request data.

Specifically, in the example of FIG. 4, when it is determined that the first buffer 210 has no available space for the write request data as the determination result of step S210, the controller 100 may then temporarily store the write request data in the second buffer 220 at step S200.

Then, the controller 100 may perform steps S220 and S230 as described above with reference to FIG. 3.

Then, the controller 100 may transfer the write request data stored in the second buffer 220 to the first buffer 240 at step S240, and may perform steps S120 to S140 as described above with reference to FIG. 3.

In the example of FIG. 3, when the first buffer 210 has no available space for the write request data, the write operation is not completed until the first buffer 210 has an available space for the write request data. In the example of FIG. 4 however, when the first buffer 210 has no available space for the write request data, the write request data may be temporarily stored in the second buffer 220 at step S200. At the time of step S200, the host 1 may determine that the write operation is completed and thus may perform another operation. Thus, the operation performance of the semiconductor apparatus may be further improved.

Figure 5:
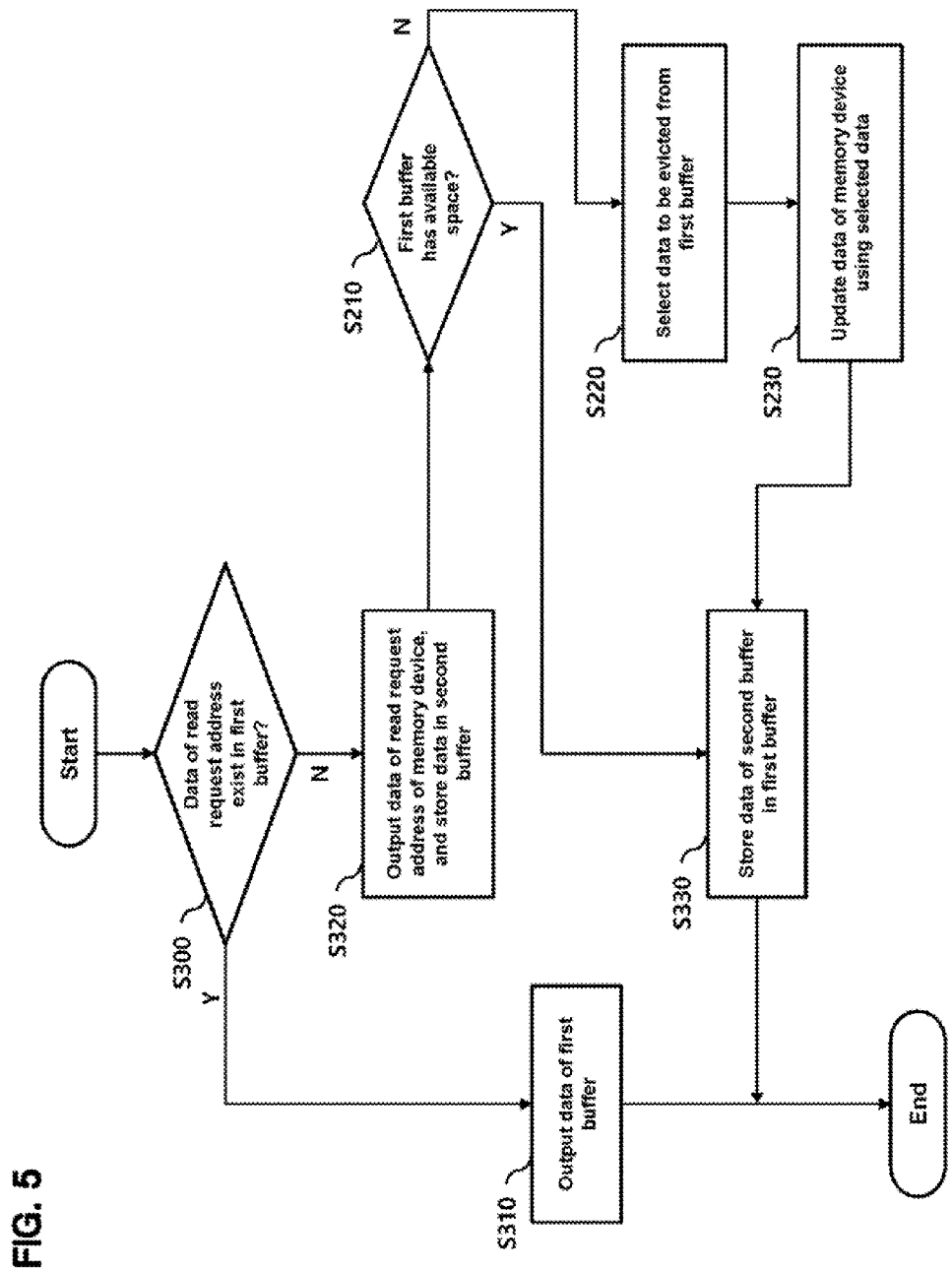
FIG. 5 is a flowchart illustrating an example of a read operation of a memory device according to an embodiment of the present invention.

FIG. 5 is a flowchart illustrating an example of a read operation of the memory device 300. Accordingly, when a read request is provided from the host 1, the controller 100 may determine whether data of an address may corresponding to the read request (hereinafter, also referred to as a read request address) is stored in the first buffer 210 at step S300.

When the data of the read request address is stored in the first buffer 210 (i.e., a buffer hit), the controller 100 may read the data of the read request address from the first buffer 210 at step S310.

When the data of the read request address is not stored in the first buffer 210 (i.e., the buffer miss) as the determination result of step S300, the controller 100 may read the data of the read request address from the memory device 300, and temporarily store the read data in the second buffer 220 at step S320.

Then, the controller 100 may determine whether the first buffer 210 has an available space for the read data at step S210.

When the first buffer 210 has an available space for the read data, the controller 100 may then store the read data stored in the second buffer 220 into the first buffer 210 at step S330.

When the first buffer 210 has no available space for the read data as the determination result of step S210, the controller 100 selects data to be evicted from the first buffer 210 to the memory device 300 at step S220, and may then update the data in the memory device 300 with the data selected at step S230.

The controller 100 may then store the read data stored in the second buffer 220 into the first buffer 210 at step S330.

So far, it has been described that steps S210, S220, and S230 for securing an available space for the write request data and the read data in the first buffer 210 may be performed during the read and write operation. However, it is noted that these steps may be performed in an idle state where no requests are provided from the host 1.

Figure 6:
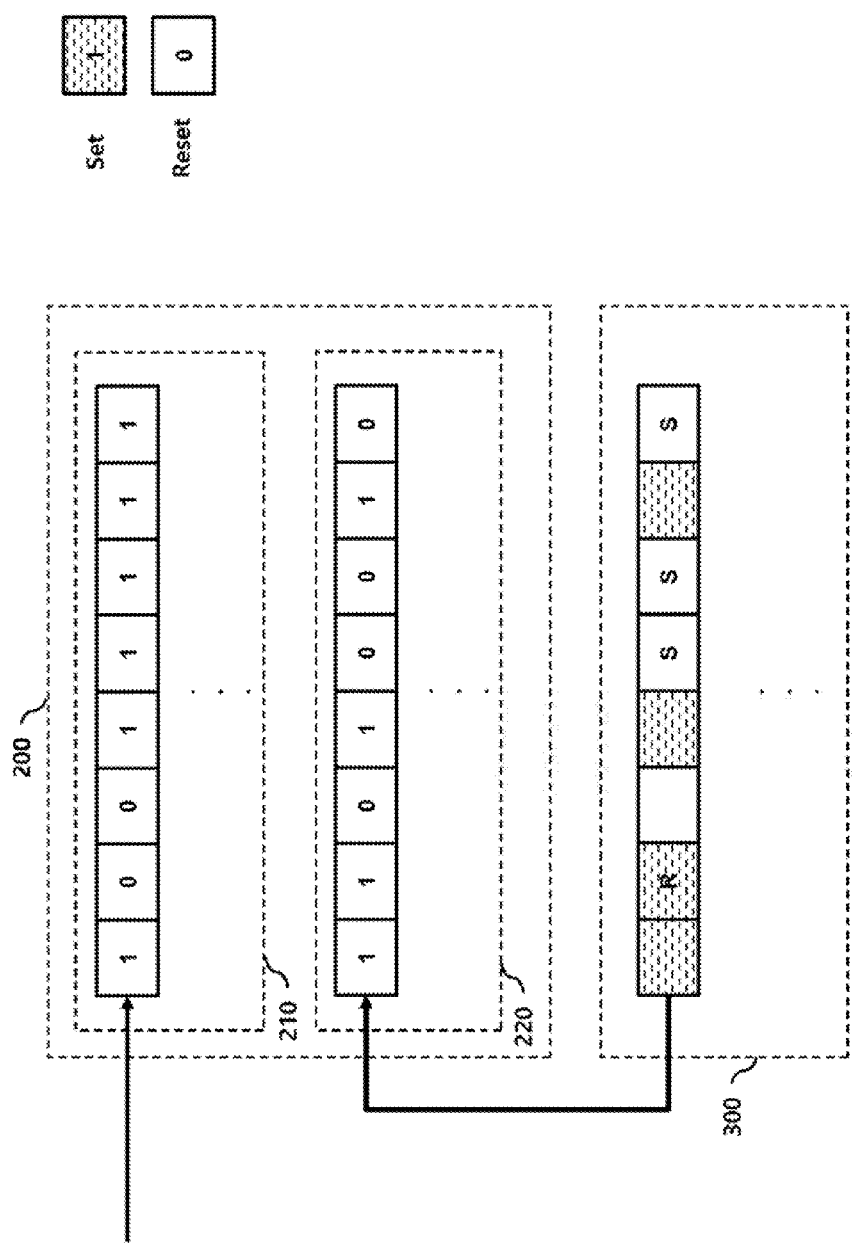
FIGS. 6 to 8 are diagrams describing an example of a write operation of a semiconductor apparatus shown in FIG. 3.
Figure 7:
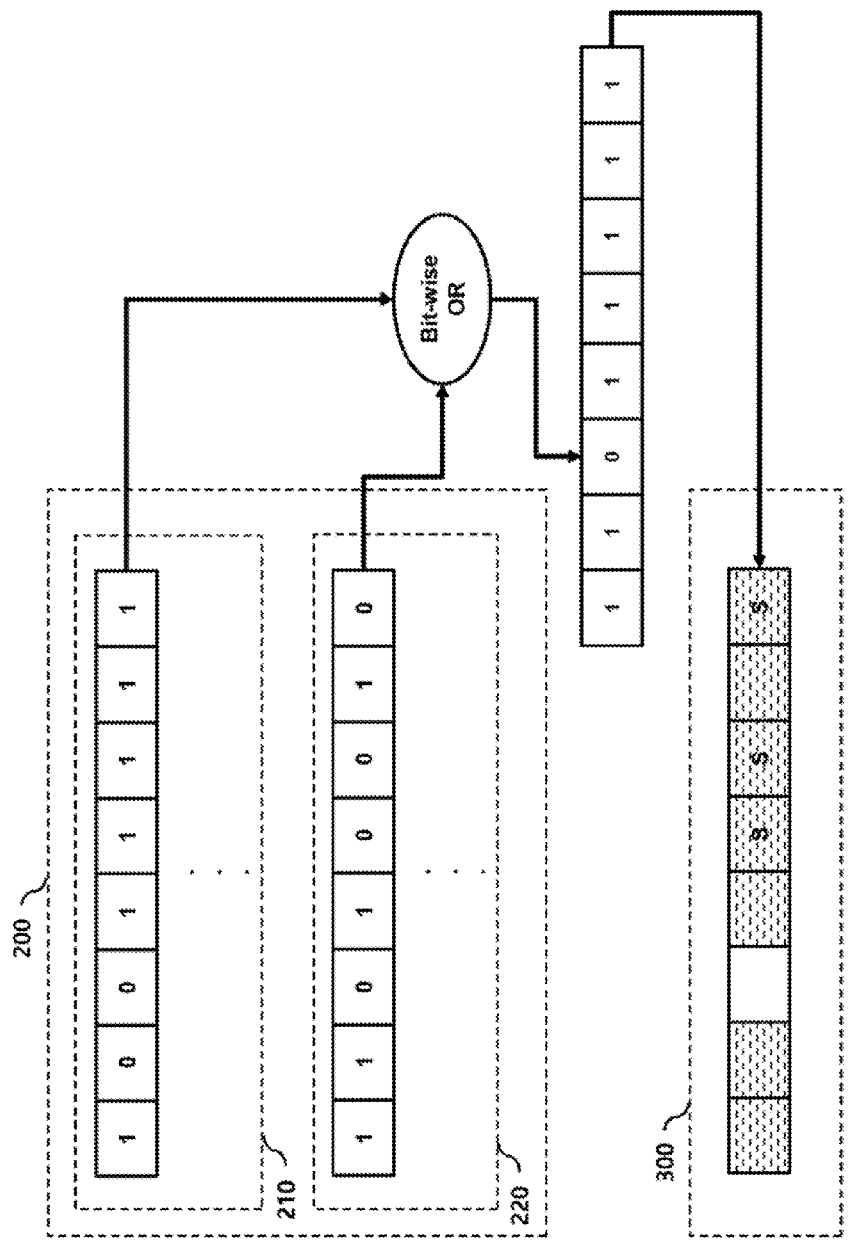
Figure 8:
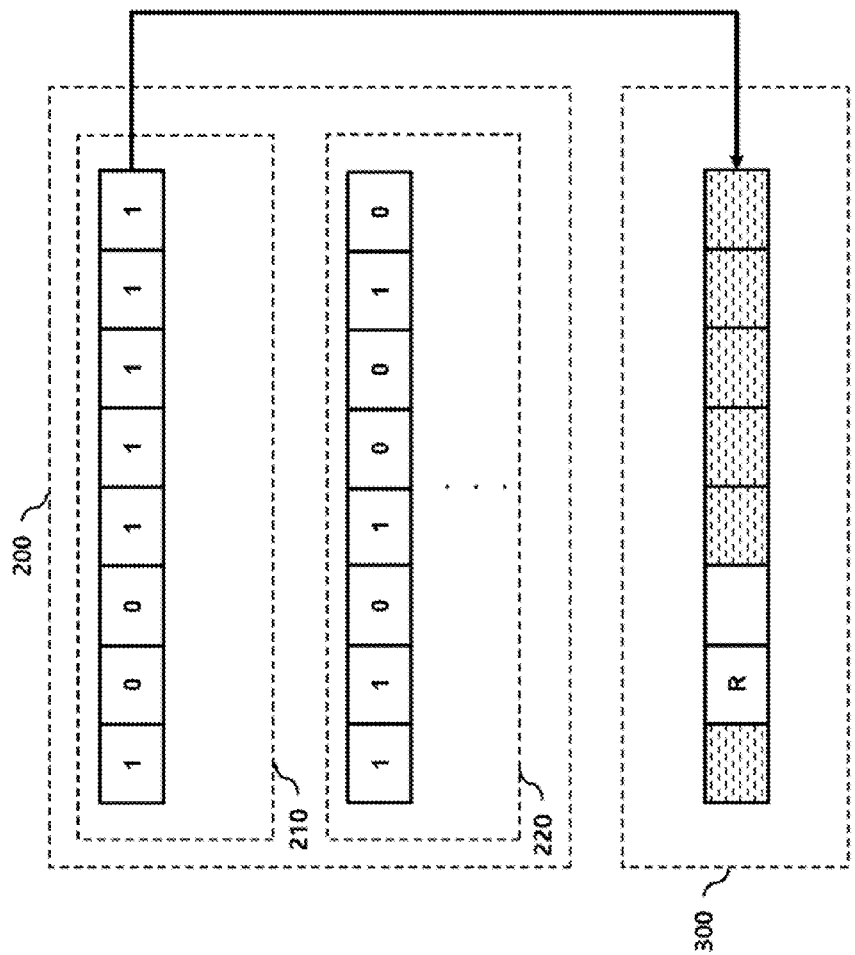

FIGS. 6 to 8 are diagrams describing an example of a write operation of a semiconductor apparatus 1000 shown in FIG. 3, wherein the memory device 300 is assumed to be a PCRAM device.

Furthermore, as an example, the read and write operations of the memory device 300 are shown as being performed by units of 8 bits. It is noted, however, that the invention is not limited in this way.

In FIGS. 6 to 11, a set state of the memory device 300 is represented by a patterned box while a reset state is represented by a non-patterned box. Further, for example, the set state may correspond to a logical value of 1 and the reset state may correspond to a logical value of 0.

FIG. 6 is a diagram nay corresponding to steps S110 and S120 of FIG. 3. For example, the controller 100 may update the data of the write request address stored in the first buffer 210 with the write request data "10011111" at step S110.

At this time, suppose that 8 memory cells (i.e., the unit of the write operation the write request address in the memory device 300 have "set", "set", "reset", "set", "reset", "reset", "set", and "reset" states, respectively, as illustrated in FIG. 6. The states may correspond to data "11010010", and the controller 100 may temporarily store the data "11010010" at the write request address of the memory device 300 in the second buffer 220 at step S120.

According to the prior art, the write request data "10011111" may be directly written to the memory cells having the states corresponding to data "11010010", the reset operation for one cell and set operations for three cells must be performed as respectively marked as "R" and "S" in FIG. 6. Thus, the operation time is dictated by the time required for the set operations.

FIG. 7 is a diagram corresponding to steps S130 and S140 of FIG. 3. The controller 110 may perform a bit-wise OR operation on the write request data "10011111" stored in the first buffer 210 and the data "11010010" of the write request address which may be stored in the second buffer 220 at step S130. Then, the controller 110 may update the data "11010010" of the write request address of the memory device 300 with the data "11011111" obtained through the bit-wise OR operation at step S140.

As marked as "S" in FIG. 7, three set operations may be required to update the data "11010010" of the write request address of the memory device 300 with the data "11011111" at step S140, thereby reducing the reset operation when compared to the prior art described with reference to FIG. 6. That is, the data of the memory device 300 may be updated through the bit-wise OR operation on the data of the first and second buffers 210 and 220. Thus only the set operations may be performed at step S140.

Further, since the set operation of step S140 may be performed after the write request is completed by updating the data of the write request address stored in the first buffer 210 with the write request data at step S110, the set operation of step S140 has no influence on the write performance of the memory device 300 at step S110.

As the result of the set operations of step S140, the memory device 300 has the states corresponding to data "11011111".

FIG. 8 is a diagram corresponding to step S230 of FIG. 3. In FIG. 8, it is assumed that the data "10011111" of the first buffer 210 as exemplified in FIGS. 6 and 7 may be selected to be evicted to the memory device 300.

As illustrated in FIG. 8, the controller 110 may evict the selected data "10011111" stored in the first buffer 210 to the memory device 300, and may then update the data "11011111" of the memory device 300 with the selected data "10011111" at step S230.

As marked as "R" in FIG. 8, a single reset operation is required for one cell of the memory device 300.

Since the set operations are already performed at step S140, there is no need to perform further set operations at step S230.

Since no set operations need to be performed on the memory device 300 in order to secure an available space for the write request data in the first buffer 210 at step S230, it is possible to reduce the time required for securing the available space for the write request data at step S230.

Figure 9:
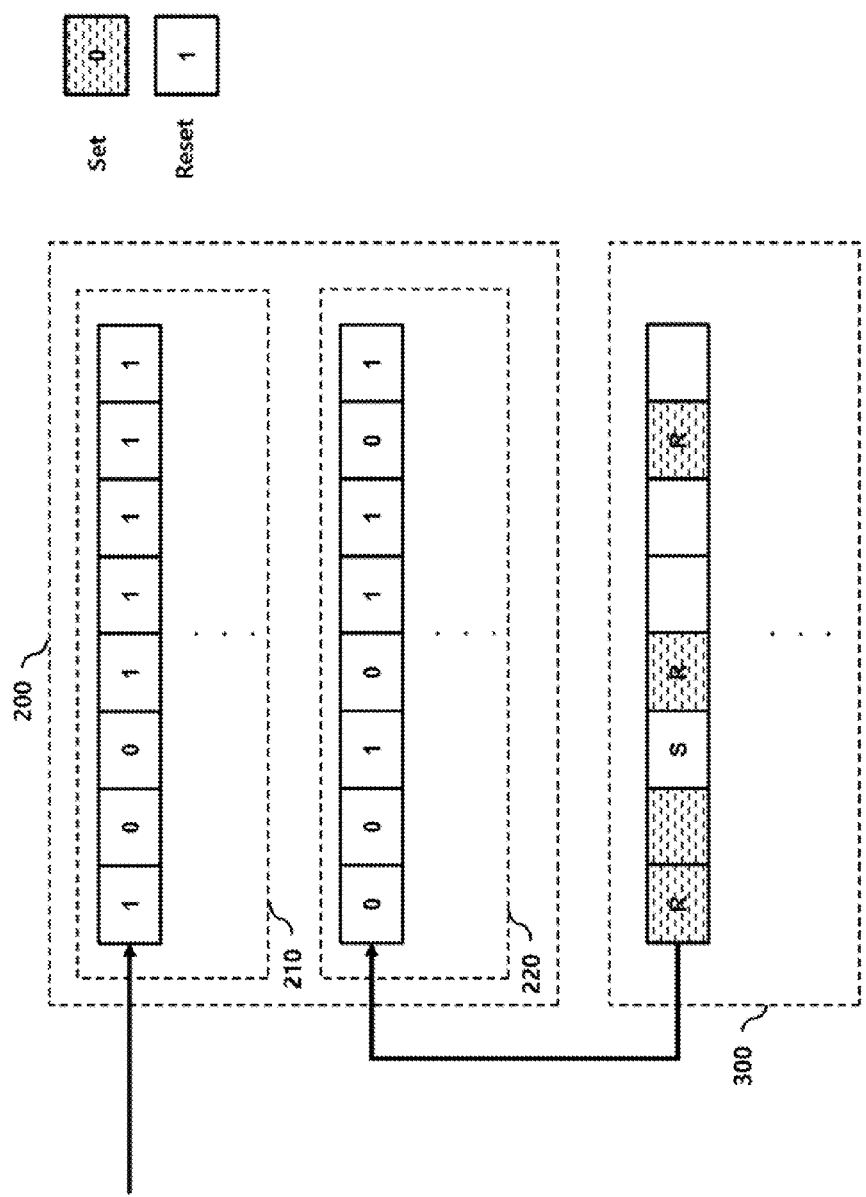
FIGS. 9 to 11 are diagrams describing another example of a write operation of a semiconductor apparatus shown in FIG. 3.
Figure 10:
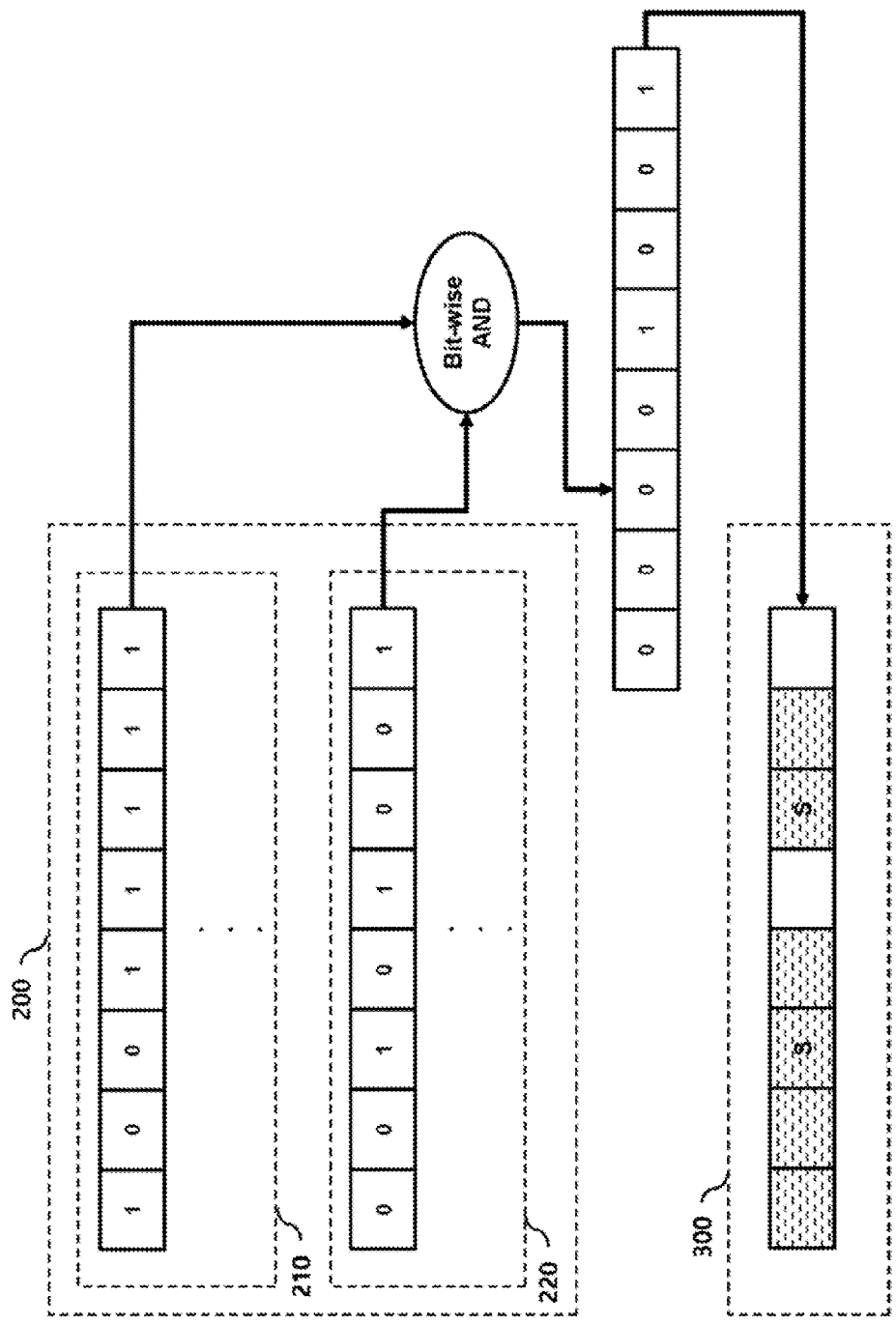
Figure 11:
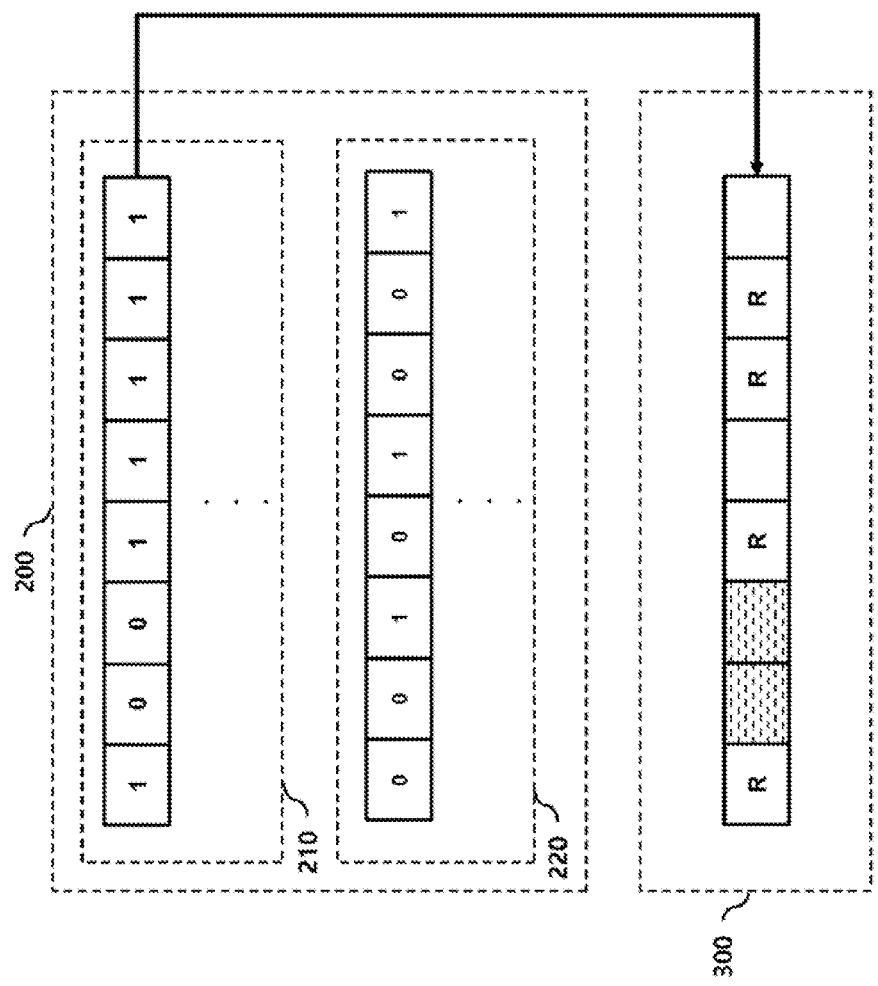

FIGS. 9 to 11 are diagrams describing another example of a write operation of a semiconductor apparatus shown in FIG. 3. In this example, the set state may correspond to a logical value of 0 and the reset state may correspond to a logical value of 1.

FIG. 9 is a diagram is corresponding to steps S110 and S120 of FIG. 3. For example, the controller 100 may update the data of the write request address stored in the first buffer 210 with the write request data "10011111" at step S110.

At this time, 8 memory cells (i.e., the unit of the write operation) of the write request address in the memory device 300 may have "set", "set", "reset", "set", "reset", "reset", "set", and "reset" states, respectively, as illustrated in FIG. 9. The states may correspond to data "00101101", and the controller 100 may temporarily store the data "11010010" at the write request address of the memory device 300 in the second buffer 220 at step S120.

According to the prior art as described above, the write request data "10011111" may be directly written to the memory cells having the states corresponding to data "11010010", and thus the reset operation for one cell and set operations for three cells must be performed as respectively marked as "R" and "S" in FIG. 9. Thus, the operation time dictated by the time required for the set operations.

FIG. 10 is a diagram corresponding to steps S130 and S140 of FIG. 3. The controller 110 may perform a bit-wise AND operation on the write request data "10011111" stored in the first buffer 210 and the data "11010010" of the write request address which may be stored in the second buffer 220 at step S130. Then, the controller 110 may update the data "11010010" of the write request address of the memory device 300 with the data "00001001" obtained through the bit-wise AND operation at step S140.

As marked as "S" in FIG. 10, two set operations may be required to update the data "11010010" of the write request address of the memory device 300 with the data "00001001" at step S140, thereby reducing the reset operation when compared to the prior art described with reference to FIG. 9. For example, the data of the memory device 300 may be updated through the bit-wise AND operation on the data of the first and second buffers 210 and 220, and thus only the set operations may be performed at step S140.

Further, since the set operations of step S140 may be performed after the write request is completed by updating the data of the write request address stored in the first buffer 210 with the write request data at step S110, the set operations of step S140 have no influence on the write performance of the memory device 300 at step S110.

As the result of set operation of step S140, the memory device 300 has the states corresponding to data "00001001".

FIG. 11 is a diagram corresponding to step S230 of FIG. 3.

In FIG. 11, the data "10011111" of the first buffer 210 as exemplified in FIGS. 9 and 10 may be selected to be evicted to the memory device 300.

As illustrated in FIG. 11, the controller 110 may evict the selected data "10011111" stored in the first buffer 210 to the memory device 300, and may then update the data "00001001" of the memory device 300 with the selected data "10011111" at step S230.

As marked as "R" in FIG. 11, four reset operations may be required for four cells of the memory device 300.

Since the set operations may be already performed at step S140, there is no need to perform further set operations at step S230.

Since no set operations need to be performed on the memory device 300 in order to secure an available space for the write request data in the first buffer 210 at step S230, it is possible to reduce the time required for securing the available space for the write request data at step S230.

The effect disclosed in FIGS. 8 to 11 may be exhibited in the same manner at step S230 in examples of FIGS. 4 and 5.

According to the embodiments of the present invention, the semiconductor apparatus can improve the performance of a write operation by preferentially performing the write operation for a buffer. Furthermore, the semiconductor apparatus can improve the performance of the memory device by separating and performing the reset operation and the set operation requiring a relatively large amount of time.

Although various embodiments have been described for illustrative purposes, it will be apparent to those skilled in the art that various changes and modifications may be made without departing from the spirit and scope of the invention as defined in the following claims.

What is claimed is:

1. A semiconductor apparatus comprising:
a memory device;
a first buffer; and
a controller configured to store write request data in the first buffer in response to a write request from a host, to perform a logic operation on the write request data and a memory data stored at write request address of the write request, and to update the memory data at the write request address in the memory device with a result of the logic operation,
wherein the controller determines a type of the logic operation to increase number of bits having a specific logic level in the result.

2. The semiconductor apparatus of claim 1, wherein the memory device comprises a memory cell of which the write operation time changes according to a logic value of data to be stored in the memory device.

3. The semiconductor apparatus of claim 2, wherein the memory device comprises a Phase Change Random Access Memory (PCRAM).

4. The semiconductor apparatus of claim 1, wherein the buffer further comprises:
a second buffer configured to store the memory data at the write request address which are read from the memory device at a write request address input in response to the write request.

5. The semiconductor apparatus of claim 4, wherein the controller stores the memory data at the write request address in the second buffer.

6. The semiconductor apparatus of claim 4, wherein when the first buffer has no available space for the write request data, the controller controls an operation of selecting eviction data in the first buffer and storing the eviction data in the memory device at the corresponding memory address.

7. The semiconductor apparatus of claim 6, wherein when the first buffer has no available space for the write request data, the controller controls an operation of temporarily storing the write request data in the second buffer, selecting eviction data in the first buffer, storing the eviction data in the memory device at the corresponding memory address, and transferring the write request data of the second buffer to the first buffer.

8. The semiconductor apparatus of claim 1, wherein the logic operation is a bit-wise AND operation or a bit-wise OR operation.

9. An operating method of a semiconductor apparatus including a memory device and first and second buffers, the method comprising:
storing write request data input in response to a write request in the first buffer;
reading from the memory device memory data at write request address input in response to the write request, and storing the memory data in the second buffer;
performing a logic operation on the write request data stored in the first buffer and the memory data stored in the second buffer; and
updating the memory data at the write request address in the memory device with a result of the logic operation,
wherein a type of the logic operation is determined to increase number of bits having a specific logic level in the result.

10. The operating method of claim 9, further comprising, when data corresponding to the write request address is not stored in the first buffer and the first buffer has no available space:
selecting eviction data to be evicted from the first buffer; and
storing the eviction data in the memory device at the corresponding memory address.

11. The operating method of claim 9, further comprising, when data corresponding to the write request address is not stored in the first buffer and the first buffer has no available space:
storing the write request data in the second buffer;
selecting eviction data to be evicted from the first buffer;
storing the eviction data in the memory device at the corresponding memory address; and
transferring the write request data of the second buffer to the first buffer.

12. The operating method of claim 11, further comprising:
reading from the memory device the memory data at write request address, and storing the memory data at write request address in the second buffer;

performing the logic operation on the write request data stored in the first buffer and the memory data stored in the second buffer; and updating the memory data at write request address in the memory device with the result of the logic operation.

* * * * *